(12) United States Patent
Yang et al.

(10) Patent No.: US 7,433,093 B2
(45) Date of Patent: *Oct. 7, 2008

(54) METHOD AND APPARATUS FOR INCREASING SIGNAL TO NOISE RATIO

(75) Inventors: Shang-Yu Yang, Kaohsiung (TW); Chen-Hsiang Shih, Chang-Hua (TW); Chin-Lin Chang, Hsin-Chu (TW)

(73) Assignee: Transpacific IP Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/410,847

(22) Filed: Apr. 24, 2006

(65) Prior Publication Data

US 2006/0187502 A1 Aug. 24, 2006

Related U.S. Application Data

(63) Continuation of application No. 10/121,545, filed on Apr. 15, 2002, now Pat. No. 7,034,957.

(51) Int. Cl.
  *H04N 1/04* (2006.01)
(52) U.S. Cl. .................. 358/474; 358/1.2; 358/475; 358/463; 348/297; 348/229.1; 250/208.1

(58) Field of Classification Search .................. 358/1.2, 358/475, 509, 520, 463; 348/297, 229.1, 348/221.1, 362, 312; 250/208.1
See application file for complete search history.

(56) References Cited

U.S. PATENT DOCUMENTS

| | | | |
|---|---|---|---|
| 4,884,142 A * | 11/1989 | Suzuki | 348/296 |
| 4,985,882 A | 1/1991 | Tanaka et al. | |
| 5,479,207 A | 12/1995 | Degi et al. | |
| 5,535,077 A * | 7/1996 | Saito et al. | 360/315 |
| 5,606,395 A * | 2/1997 | Yang et al. | 399/81 |
| 5,773,814 A | 6/1998 | Phillips et al. | |
| 6,084,936 A | 7/2000 | Patch | |
| 6,254,003 B1 * | 7/2001 | Pettinelli et al. | 235/454 |
| 6,529,630 B1 * | 3/2003 | Kinjo | 382/190 |
| 6,571,189 B2 * | 5/2003 | Jensen et al. | 702/104 |
| 6,924,841 B2 * | 8/2005 | Jones | 348/294 |
| 6,933,168 B2 | 8/2005 | Bawolek et al. | |
| 7,015,956 B2 * | 3/2006 | Luo et al. | 348/229.1 |
| 7,034,957 B2 * | 4/2006 | Yang et al. | 358/1.2 |
| 2005/0219378 A1 | 10/2005 | Kubota et al. | |

* cited by examiner

*Primary Examiner*—Edward L. Coles
*Assistant Examiner*—Negussie Worku
(74) *Attorney, Agent, or Firm*—Stolowitz Ford Cowger LLP

(57) ABSTRACT

A method for increasing signal to noise ratio is disclosed. The method can automatically detect saturation output voltage of the photosensors via adjusting exposure time or illumination intensity so as to obtain optimum output voltage of the photosensors as well as high signal to noise ratio that can generate high quality images.

34 Claims, 3 Drawing Sheets

METHOD AND APPARATUS FOR INCREASING SIGNAL TO NOISE RATIO

CROSS-REFERENCE TO RELATED APPLICATIONS

This application is a continuation of U.S. application Ser. No. 10/121,545, filed Apr. 15, 2002 now U.S. Pat. No. 7,034,957, entitled "Method for Increasing Signal to Noise Ratio".

BACKGROUND OF THE INVENTION

1. Field of the Invention

The present invention relates to a method for increasing signal to noise ratio, and more particularly to a method for increasing signal to noise ratio that can automatically detect saturation output voltage of photosensors via adjusting exposure time or illumination intensity so as to obtain optimum output voltage of the photosensors.

2. Description of the Related Art

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes a light source, a linear array of photoelectric sensing elements (generally a CCD sensor or a CMOS sensor, or a CIS sensor), an analog amplifier, an analog to digital converter (ADC) a controller and a random access memory (RAM).

The CCD sensor includes a large number (e.g., 2000) of photoelectric sensing elements arranged in a linear array. Each photoelectric sensing element will capture light representing a single pixel of the image. The array will capture a line of pixels. By moving the CCD sensor across a document, the entire document can be scanned one line at a time.

The conversion into digital signals of light reflected from or transmitted through the document takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog to digital converter for digital image processing and storage in the RAM.

In conventional optical scanners, the CCD sensor is slowly scanned across a document. The photoelectric sensing elements are continuously exposed. After a fixed exposure time, a line of charges (representing a line of pixels of the image) are dumped from the photoelectric sensing elements to one or more analog shift registers. Once the charges are dumped, the photoelectric sensing elements resume generating charges in response to the light to which they are exposed. However, before the next line of charges can be dumped, the analog shift registers must be cleared and the charges stored therein must be processed.

The processing time for the data in the CCD sensor includes the time required to serially shift a line of charges from the analog shift registers, to convert the charges to analog voltages, to digitize the voltages, to perform any desired image processing and to store the digital representation of each pixel in the RAM. Once all pixels or charges of a line have been processed, the charges of the next line can be dumped from the photoelectric sensing elements. Thus, the time required to process all pixels or charges of a line would be equal to the exposure time of the CCD sensor. Conventional optical scanners fix the exposure time equal to this processing time. For example, if it takes one microsecond to process each charge or pixel, then a 2000 pixel line would require two milliseconds for full processing. Thus, the exposure time for the CCD sensor would be equal to a fixed two milliseconds.

The CCD sensor will generally have a fixed noise level. Thus, to optimize the signal to noise ratio of the scanner, it is desirable to maximize the optical signal received at the CCD sensing element. By maximizing the optical signal, with a fixed noise level, the signal to noise ratio can be maximized. However, image quality provided by conventional optical scanners is always limited or hardly upgraded since their expose time and illumination intensity are fixed and a minimum saturation voltage of photoelectric sensing elements, instead of an actual saturation voltage, is set as standard system value. It is desirable to provide a method for increasing the signal to noise ratio of the sensor to overcome the limitations of the prior art.

SUMMARY OF THE INVENTION

It is therefore an object of the invention to provide a method for increasing signal to noise ratio and image quality.

It is another object of this invention to completely utilize the saturation output voltage of the photosensors in an image scanner.

It is a further object of this invention to provide a method for automatically detecting saturation output voltage of the photosensors via adjusting exposure time or illumination intensity so as to obtain optimum output voltage of the photosensors.

To achieve these objects, and in accordance with the purpose of the invention, the invention provide a method for increasing signal to noise ratio. The out voltage of photosensors such as charge coupled devices (CCD) or complemental metal oxide semiconductor sensors is usually derated or lower than the input voltage of the analog to digital converter (ADC). The method for increasing signal to noise ratio of the invention is used to find out the actual saturation voltage of the photosensors and then increases the output voltage of the photosensors by increasing exposure time tint or lamp illumination to near the actual saturation voltage of the photosensors so that the signal to noise ratio can be increased and image quality can be upgraded. The method comprises the following steps. First of all exposure time $T_n$ or illumination $L_{Xn}$ is set. Next a white target chart for said exposure time $T_n$ (illumination $L_{Xn}$) is scanned. Then output digital data $D_n$ via an N bit analog to digital converter are generated. Next output digital data $D_n$ is compared with $2^N-1$. Then exposure time $T_n$ is increased to exposure time $T_{n+1}$ if output digital data is smaller than $2^N-1$. Next white target chart is scanned for exposure time $T_{n+1}$. Then output digital data $D_{n+1}$ are generated via N bit analog to digital converter. Next output digital data $D_{n+1}$ are compared with said output digital data $D_n$. Exposure time $T_n$ is saved when output digital data $D_{n+1}$ is not larger than output digital data $D_n$. Exposure time $T_{n+1}$ is further increased when output digital data $D_{n+1}$ is larger than output digital data $D_n$. However, if output digital data is not smaller than $2^N-1$, then exposure time $T_n$ decreased to exposure time $T_{n+1}$. White target chart is scanned for said exposure time $T_{n+1}$. Output digital data $D_{n+1}$ are generated via said N bit analog to digital converter. Then output digital data $D_{n+1}$ are compared with output digital data $D_n$ Exposure time $T_{n+1}$ is saved when output digital data $D_{n+1}$ is not larger than output digital data $D_n$. Exposure time $T_{n+1}$ is further decreased when output digital data $D_{n+1}$ is larger than output digital data $D_n$.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the method for increasing signal noise ratio described below do not cover a complete system and method. The present invention can be practiced in conjunction with various software and hardware that are used in the art, and only so much of the commonly practiced components and steps are included herein as are necessary to provide an understanding of the present invention.

The present invention will be described in detail with reference to the accompanying drawings. It should be noted that the drawings are in greatly simplified form.

Figure 1:
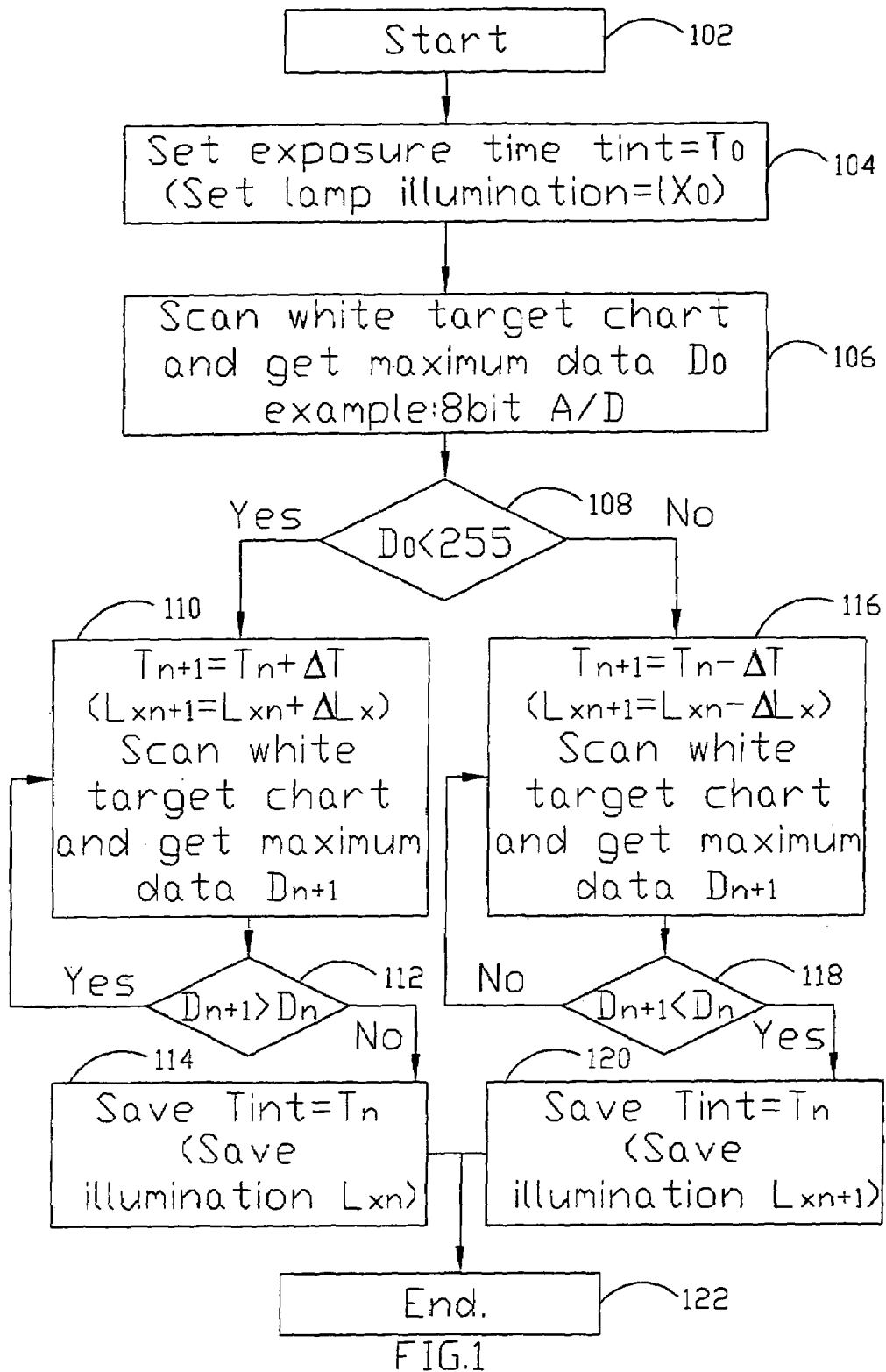
FIG. 1 shows a flow chart of the method for increasing signal noise ratio.

Referring to FIG. 1, a flow chart of the method for increasing signal to noise ratio in accordance with one embodiment of the invention is shown. Under common circumstance, the out voltage of photosensors such as charge coupled devices (CCD) or complemental metal oxide semiconductor sensors is lower than the input voltage of the analog to digital converter (ADC). The method for increasing signal to noise ratio of the invention is used to find out the actual saturation voltage of the photosensors and then increases the output voltage of the photosensors by increasing exposure time tint or lamp illumination to near the actual saturation voltage of the photosensors so that the signal to noise ratio can be increased and image quality can be upgraded. First of all, after step 102, original exposure time tint $T_0$ or original lamp illumination $L_{x0}$ is set in step 104. Since illumination energy E equals the product of exposure time tint T and lamp illumination L, increasing either exposure time tint T or illumination L will increase illumination energy E. Next in step 106, a white target chart is scanned and the photosensors convert the light which it receives into an electric charge. The magnitude of the charge depend on illumination $L_{x0}$ (the intensity of the light) and exposure time tint $T_0$ set forth. Then the charges from the photosensors are converted into analog voltages via the analog amplifier. Finally, the analog voltages are digitized to form a maximum data $D_0$ by the analog to digital converter for digital image processing. If a 8 bit analog to digital converter is utilized, data $D_0$ is from 0 to 255. In step 108, maximum data $D_0$ is compared to 255 if a 8 bit analog to digital converter is utilized. If maximum data $D_0$ is smaller than 255, then exposure time tint $T_n$ or lamp illumination $L_{Xn}$ should be increased and the white target chart is scanned again in step 110. The magnitude of the charge now depends on illumination $L_{Xn+1}$ and exposure time tint $T_{n+1}$. Then the charges from the photosensors are converted into analog voltages via the analog amplifier. Finally, the analog voltages are digitized to form a maximum data $D_{n+1}$ by the analog to digital converter for digital image processing. The maximum data $D_{n+1}$ is then compared to the previous maximum data $D_n$ (starting from $D_0$) in step 112. If the maximum data $D_{n+1}$ is not larger than the previous maximum data $D_n$, that means that the output voltage of the photosensors has been saturated and exposure time tint $T_n$ or illumination $L_{Xn}$ generating the maximum data $D_n$ is saved in step 114. On the contrary, if the maximum data $D_{n+1}$ is larger than the previous maximum data $D_n$, that means that the output voltage of the photosensors has not been saturated and the process goes back step 110 until the output voltage of the photosensors is saturated.

If maximum data $D_0$ is not smaller than 255, then exposure time tint T or lamp illumination $L_{Xn}$ should be decreased and the white target chart is scanned again in step 116. The magnitude of the charge depend on illumination $L_{Xn+1}$ and exposure time tint $T_{n+1}$. Then the charges from the photosensors are converted into analog voltages via the analog amplifier. Finally, the analog voltages are digitized to form a maximum data $D_{n+1}$ by the analog to digital converter for digital image processing. The maximum data $D_{n+1}$ is then compared to the previous maximum data $D_n$ (starting from $D_0$) in step 118. If the maximum data $D_{n+1}$ is smaller than the previous maximum data $D_n$, that means that the output voltage of the photosensors has been saturated and exposure time tint $T_{n+1}$ or illumination $L_{Xn+1}$ generating the maximum data $D_{n+1}$ is saved in step 120. On the contrary, if the maximum data $D_{n+1}$ is not smaller than the previous maximum data $D_n$, that means that the output voltage of the photosensors has not been saturated and the process goes back step 116 until the output voltage of the photosensors is saturated.

Figure 2:
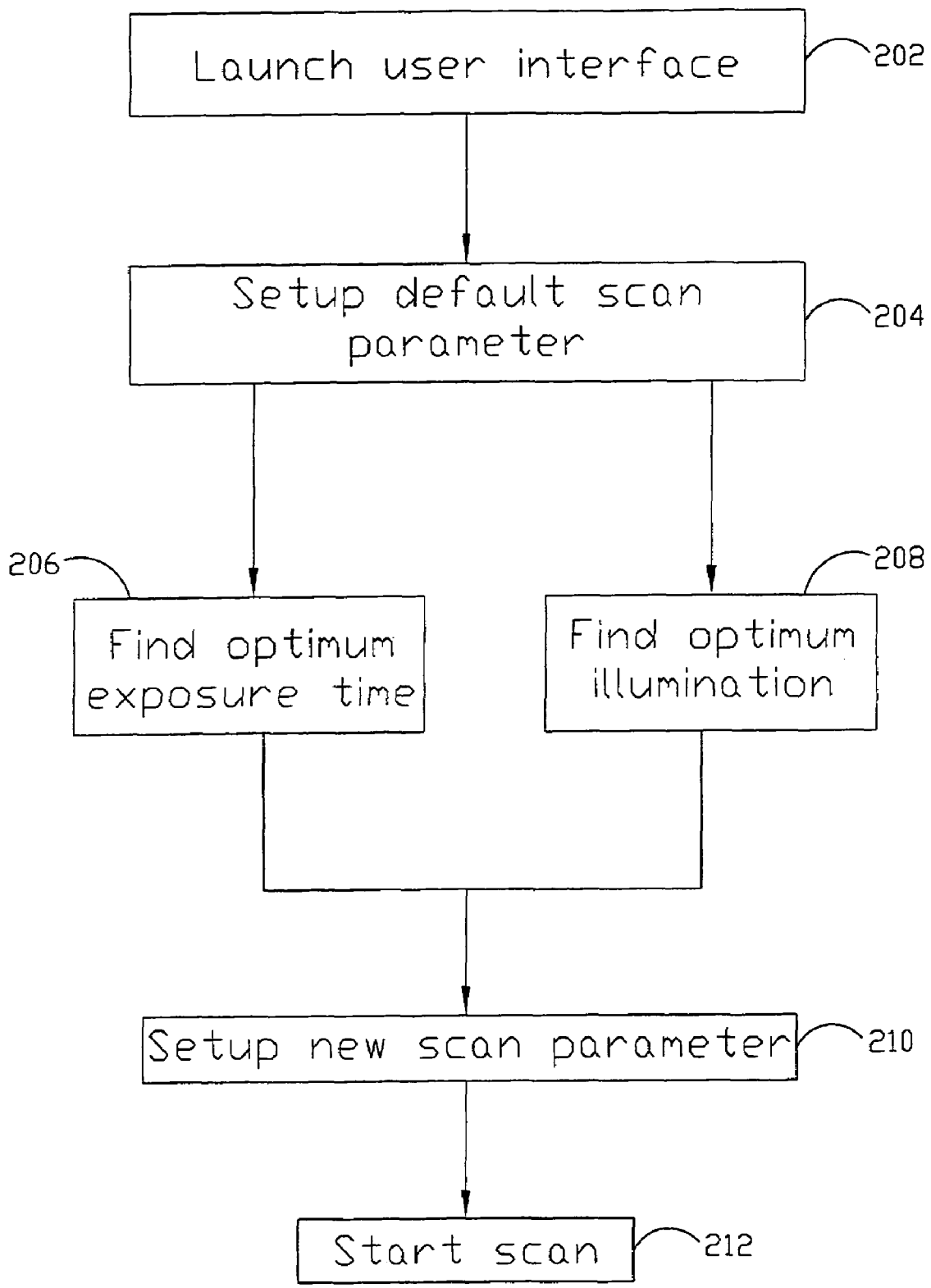
FIG. 2 shows a flow chart of how the method of this invention is utilized in a scanning procedure.

Referring to FIG. 2, a flow chart of how the method of this invention is utilized in a scanning procedure is shown. In step 202, an user interface operated in personal computer is launched. Then default scan parameters are set up in step 204. Next optimum exposure time or optimum illumination is found in step 206 or 208 via the method described above and shown in FIG. 1. New scan parameters obtained in step 206 or 208 are then set up before starting scan in step 212.

Figure 3:
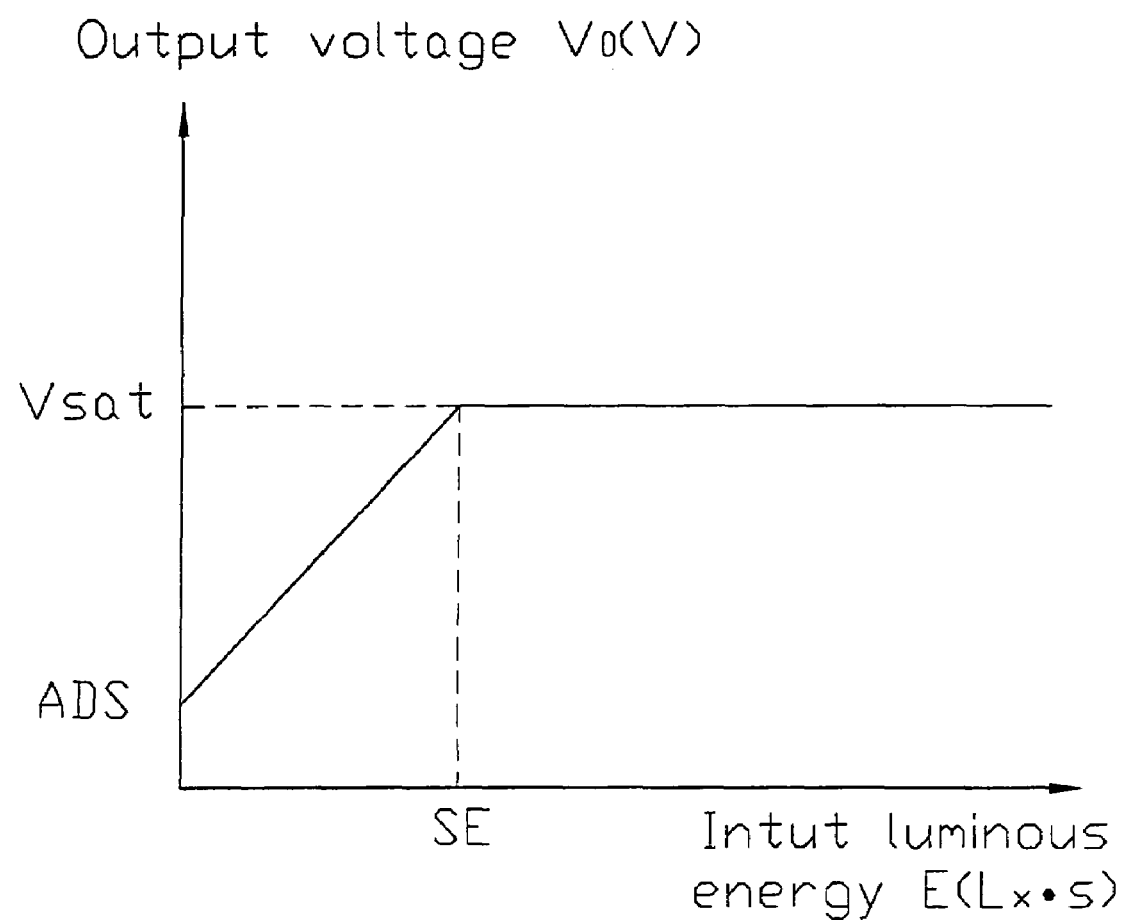
FIG. 3 shows a diagram of saturation voltage $V_{sat}$ versus input illumination energy E.

FIG. 3 shows a diagram of output voltage $V_0$ of photosensors versus input illumination energy E ($L_x \times T$). As shown in the figure, output voltage $V_0$ increases linearly with input illumination energy E until saturation exposure SE is reached, wherein ADS means average dark signal. Output voltage $V_0$ equals saturation voltage $V_{sat}$ at saturation exposure SE.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method, comprising:
   scanning a white, unmarked calibration object in accordance with a stored exposure time tint setting and a stored lamp illumination setting;
   generating digital output data in accordance with said scanning, said digital output data generated using one or more components including an N bit analog to digital converter; and
   increasing one or both of the stored settings if the digital output data is less than a predefined number;
   wherein the predefined number is $2^N - 1$.

2. The method of claim 1, further comprising:
   rescanning the white, unmarked calibration object in accordance with the increased settings;

generating additional digital output data in accordance with said rescanning; and further increasing one or more of the stored settings if the additional digital output data indicates that photo sensors were not saturated during the rescanning.

3. The method of claim 2, further comprising:

saving the increased settings without further changes if the additional digital output data indicates that a saturation threshold was reached.

4. The method of claim 1, further comprising: decreasing one or both of the stored settings if the digital output data is equal to $2^N-1$.

5. The method of claim 4, further comprising:

rescanning the white, unmarked calibration object in accordance with the decreased settings;

generating additional digital output data in accordance with said rescanning; and further decreasing one or more of the settings if the additional digital output data indicates that the photo sensors were saturated during the rescanning.

6. The method of claim 5, further comprising repeating the process of rescanning, generating and decreasing until a saturation threshold is reached.

7. An article comprising: a storage medium encoded with instructions, that, when executed, are operable to:

scan a calibration object using a stored exposure time tint setting and a stored lamp illumination setting;

generate digital output data in accordance with said scanning, the digital output data generated at least in part by utilizing an N bit analog to digital converter; and increase one or both of the stored settings if the digital output data is less than a predefined value;

wherein the predefined value is equal to $2^N-1$.

8. The article of claim 7, wherein the instructions, when executed, are further operable to:

rescan the calibration object in accordance with the increased settings;

generate additional digital output data in accordance with said rescanning; and further increase one or both of the stored settings if the additional digital output data indicates that a saturation threshold was not reached during the rescanning.

9. The article of claim 8, wherein the instructions, when executed, are further operable to save the increased settings if the additional digital output data indicates that the saturation threshold was reached during the rescanning.

10. The article of claim 7, wherein the instructions, when executed, are further operable to:

decrease one or both of the stored settings if the digital output data is less than $2^N-1$.

11. The article of claim 10, wherein the instructions, when executed, are further operable to:

rescan the calibration object in accordance with the decreased settings;

generate additional digital output data in accordance with said rescanning; and further decrease the stored settings if the additional digital output data indicates that photo sensors were saturated during the rescanning.

12. The article of claim 11, wherein the instructions, when executed, are further operable to repeat the rescanning, generating according to the rescanning, and decreasing according to the rescanning until the additional output data indicates that a saturation threshold has been reached.

13. A scanning apparatus, comprising:

means for scanning a calibration object in accordance with scanner settings that correspond to a first illumination energy value;

means for generating digital output data in accordance with said scanning, the generation means including an analog to digital converter;

means for comparing the digital output data to a predefined value, the predefined value corresponding to a number of bits of the analog to digital converter; and means for calibrating the scanner settings to correspond with a second illumination energy value that is greater than the first illumination energy value if the digital output data is less than the predefined value.

14. The apparatus of claim 13, wherein:

said means for scanning is capable of rescanning the calibration object in accordance with the calibrated settings;

said means for scanning is capable of generating additional digital output data in accordance with said rescanning; and said means for calibrating is capable of recalibrating the scanner settings to correspond with a third different illumination energy value that is greater than the second illumination energy value if the additional digital output data indicates that a saturation threshold has not been reached.

15. The apparatus of claim 14, further comprising means for saving the calibrated scanner settings if the additional digital output data is equal to the saturation threshold.

16. The apparatus of claim 13, wherein:

said means for calibrating is capable of adjusting the scanner settings to correspond to a third illumination energy value that is less than the first illumination energy value if the digital output data is equal to the predefined value.

17. The apparatus of claim 13 wherein to maximize light reflection during the scanning, the portion of the calibration object that is scanned is unmarked and uniformly white.

18. An article comprising: a storage medium encoded with instructions, that, when executed, are operable to:

scan a calibration object in accordance with a set illumination value;

generate digital output data in accordance with said scanning, where the digital output data is generated, at least in part, by utilizing a digital to analog converter that is configured to output digital signals ranging from zero to a predefined maximum value;

compare the digital output data to the predefined maximum value to determine whether photo sensors have been saturated; and calibrate the set illumination value according to the comparison.

19. The article of claim 18, wherein the instructions, when executed, are further operable to: repeat the process of scanning, generating, comparing and calibrating until the photo sensors reach saturation.

20. The article of claim 18, wherein the instructions, when executed, are further operable to:

calibrate a decrease to the set illumination value if the comparison indicates that the photo sensors have been saturated; and repeat the process of scanning, generating, comparing, and calibrating until the photo sensors are no longer saturated.

21. The article of claim 20, wherein the instructions, when executed, are further operable to:

save the set illumination value calibrated during a second to last one of the repeated processes.

22. The article of claim 21, wherein the set illumination value calibrated during the second to last one of the repeated processes maximizes a signal generated during scan jobs to reduce the effect of signal noise associated with scan jobs.

23. A scanning apparatus, comprising:
means for scanning a target in accordance with a set illumination value;
means for generating digital output data in accordance with said scanning, said generation means including an analog to digital converter;
means for comparing the output data to a predefined value to determine whether photo sensors used during the scanning have been saturated, the predefined value corresponding to a number of bits of the analog to digital converter; and
means for adjusting the set illumination value according to the comparison.

24. The apparatus of claim 23, wherein:
said means for scanning is capable of rescanning the target in accordance with the adjusted illumination value;
said means for generating digital output data is capable of generating additional digital output data in accordance with said rescanning; and
said means for adjusting is capable of further adjusting the illumination value if the additional digital output data indicates that the photo sensors have not been saturated.

25. The apparatus of claim 24, further comprising means for the adjusted illumination value if the additional digital output data indicates that the photo sensors have reached saturation.

26. The apparatus of claim 23, wherein the set illumination value is decreased if the comparison indicates that the photo sensors were saturated during the scanning.

27. The apparatus of claim 26, wherein:
said means for scanning is capable of rescanning the target in accordance with the decreased illumination value;
said means for generating digital output data is capable of generating additional digital output data in accordance with said rescanning; and
said means for adjusting the illumination value is capable of further decreasing the illumination value if the additional digital output data indicates that the photo sensors were saturated during the rescanning.

28. The apparatus of claim 27, further comprising means for restoring the set illumination value if the additional digital output data indicates that the photo sensors were not saturated during the rescanning.

29. The apparatus of claim 23 wherein to maximize light reflection during the scanning, the portion of the target that is scanned is white.

30. A method, comprising:
scanning a calibration object in accordance with a stored exposure time tint setting and a stored lamp illumination setting;
generating output data in accordance with said scanning; and
increasing one or both of the stored settings if the output data indicates that photo sensors were not saturated during the scanning;
wherein to maximize light reflection during the scanning, the portion of the calibration object that is scanned is unmarked and uniformly white.

31. An apparatus, comprising:
an N-bit analog to digital converter; and
calibration circuitry to increase a signal to noise ratio, said calibration circuitry operable to:
set exposure time and lamp illumination for the apparatus to, respectively, $T_x$ and $L_y$;
scan a target chart for said exposure time $T_x$ using lamp illumination $L_y$;
generate digital output data via the N bit analog to digital converter
compare said digital output data with a number corresponding to $2^N-1$;
increase one or both of said exposure time $T_x$, by a predefined increment amount K to exposure time $T_{x+K}$, and said lamp illumination $L_y$, by a predefined increment amount J to $L_{y+J}$, if said digital output data is smaller than the number;
rescan said target chart in accordance with one or both of said exposure time $T_{x+K}$ and said lamp illumination $L_{y+J}$ to generate additional digital output data; and
increase one or both of said exposure time $T_{x+K}$ and said lamp illumination $L_{y+J}$ according to said additional digital output data.

32. The apparatus of claim 31 wherein one or both of said exposure time $T_{y+K}$ and said lamp illumination $L_{y+J}$ are increased to, respectively, $T_{x+2K}$ and $L_{y+2J}$.

33. The apparatus of claim 31 wherein the calibration circuitry is operable to generate the digital output data and the additional digital output data using only a white, unmarked region of the target chart.

34. The apparatus of claim 31 wherein the number is equal to $2^N-1$.

* * * * *

UNITED STATES PATENT AND TRADEMARK OFFICE
CERTIFICATE OF CORRECTION

PATENT NO. : 7,433,093 B2  Page 1 of 1
APPLICATION NO. : 11/410847
DATED : October 7, 2008
INVENTOR(S) : Yang et al.

It is certified that error appears in the above-identified patent and that said Letters Patent is hereby corrected as shown below:

At column 5, line 10, please replace "comprising: decreasing" with --comprising: ¶ decreasing--.
At column 8, line 40, please replace "y+K" with --x+K--.

Signed and Sealed this

Eleventh Day of August, 2009

David J. Kappos
*Director of the United States Patent and Trademark Office*